United States Patent
Tsuda

(10) Patent No.: US 9,848,448 B2
(45) Date of Patent: *Dec. 19, 2017

(54) COMMUNICATION MANAGEMENT METHOD, MANAGEMENT SERVER, AND COMMUNICATION SYSTEM

(71) Applicant: Sony Corporation, Tokyo (JP)

(72) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 14/735,601

(22) Filed: Jun. 10, 2015

(65) Prior Publication Data
US 2015/0282220 A1   Oct. 1, 2015

Related U.S. Application Data

(63) Continuation of application No. 13/048,970, filed on Mar. 16, 2011, now Pat. No. 9,084,227.

(30) Foreign Application Priority Data

Mar. 24, 2010 (JP) ................... 2010-068273

(51) Int. Cl.
*H04W 4/00* (2009.01)
*H04W 76/02* (2009.01)
*H04W 60/00* (2009.01)
H04W 84/04 (2009.01)

(52) U.S. Cl.
CPC .......... *H04W 76/02* (2013.01); *H04W 60/00* (2013.01); *H04W 84/045* (2013.01)

(58) Field of Classification Search
None
See application file for complete search history.

(56) References Cited

U.S. PATENT DOCUMENTS

| 8,571,557 B2 | 10/2013 | Furukawa | |
| 8,942,690 B2 * | 1/2015 | Nasielski | H04W 48/02 455/404.2 |
| 9,392,528 B2 * | 7/2016 | Nasielski | H04W 48/02 |

(Continued)

FOREIGN PATENT DOCUMENTS

JP   2009-207106 A   9/2009

OTHER PUBLICATIONS

U.S. Appl. No. 13/048,970, filed Mar. 16, 2011, Tsuda.

*Primary Examiner* — Robert C Scheibel
(74) *Attorney, Agent, or Firm* — Wolf, Greenfield & Sacks, P.C.

(57) ABSTRACT

There is provided a communication management method including the steps of registering, by a management server managing communication of a base station, a communication terminal whose connection to the base station is to be permitted as a first communication terminal, registering, by the management server, another communication terminal as a second communication terminal based on a request from the communication terminal registered as the first communication terminal, requesting the base station, by a communication terminal, for connection, and permitting, by the management server, connection to the base station in a case the communication terminal which has requested the base station for connection is registered as the first communication terminal or the second communication terminal.

6 Claims, 9 Drawing Sheets

(56) References Cited

U.S. PATENT DOCUMENTS

| | | |
|---|---|---|
| 2005/0239445 A1 | 10/2005 | Karaoguz et al. |
| 2006/0111112 A1 | 5/2006 | Maveddat |
| 2009/0285166 A1* | 11/2009 | Huber ................ G06Q 20/1235 370/329 |
| 2010/0015948 A1* | 1/2010 | Nagano ................ G08B 25/008 455/410 |
| 2010/0197307 A1 | 8/2010 | Horn et al. |
| 2011/0028142 A1 | 2/2011 | Miyake |
| 2011/0065442 A1 | 3/2011 | Kim et al. |
| 2011/0237240 A1 | 9/2011 | Tsuda |
| 2011/0263242 A1 | 10/2011 | Tinnakornsrisuphap et al. |
| 2012/0051260 A1 | 3/2012 | Tamaki |

* cited by examiner

FIG. 3

| FIRST LIST (FEMTOCELL BASE STATION ID : AAA) |||
|---|---|---|
| TERMINAL ID | TELEPHONE NUMBER | USER NAME |
| M001 | 090−○○○○−×××× | FATHER |
| M002 | 080−○○○○−×××× | MOTHER |
| M003 | 090−△△△△−○○○○ | DAUGHTER |
| M004 | 080−△△△△−○○○○ | SON |

| SECOND LIST (FEMTOCELL BASE STATION ID : AAA) ||
|---|---|
| TERMINAL ID | TELEPHONE NUMBER |
| M008 | 090−□□□□−×××× |
| M009 | 080−○○○○−□□□□ |
| ⋮ | ⋮ |

FIG. 9

| TERMINAL LIST (FEMTOCELL BASE STATION ID : AAA) | | |
|---|---|---|
| TERMINAL ID | TELEPHONE NUMBER | REGISTRATION TYPE |
| M001 | 090−○○○○−××× | 1 |
| M002 | 080−○○○○−×××× | 1 |
| M003 | 090−△△△△−○○○○ | 1 |
| M004 | 080−△△△△−○○○○ | 1 |
| M008 | 090−□□□□−×××× | 2 |
| M009 | 080−○○○○−□□□□ | 2 |
| ⋮ | ⋮ | ⋮ |

COMMUNICATION MANAGEMENT METHOD, MANAGEMENT SERVER, AND COMMUNICATION SYSTEM

CROSS REFERENCE TO RELATED APPLICATIONS

This application is a continuation of U.S. application Ser. No. 13/048,970, now U.S. Pat. No. 9,084,227, filed Mar. 16, 2011, which claims the priority benefit of Japanese Patent Application No. JP 2010-068273 filed in the Japanese Patent Office on Mar. 24, 2010, the entire content of which are hereby incorporated by reference.

BACKGROUND OF THE INVENTION

Field of the Invention

The present invention relates to a communication management method, a management server, and a communication system.

Description of the Related Art

A 3G mobile telephone service called the third generation was started in Japan in 2002. In the beginning, the main application was transmission of small packets such as sound and emails, but with the introduction of High Speed Downlink Packet Access (HSDPA) and the like, download of larger packets, such as download of music files or shared videos, has come to be performed.

As such, with the increase in the size of packets to be downloaded, wireless communications between a base station and a terminal were expanded, and HSPA+ service realizing maximum 21 Mbps was started. Furthermore, LTE that uses OFDMA in downlink is expected to start around 2010 and a 4G service is expected to start around 2015, and a world where maximum 1 Gbps is realized with a semi-fixed terminal and maximum 100 Mbps is realized in a mobile environment is becoming a reality.

To realize a wireless environment with a high communication rate as described above, it is assumed that cells will shift to microcells and picocells. Wireless environment of dead spots at the edge of a cell can be improved to a certain degree by placing relay stations, for example, but in the case resources of base stations are in short supply, the effect obtained by placing relay stations may be reduced.

Accordingly, in indoors having Fiber To The Home (FTTH), a high-speed data communication environment is anticipated to be realized without placing load on outdoor wireless resources, by placing small base stations called femtocell base stations.

Authentication between this femtocell base station and a communications company's network is performed by a memory card for authentication typified by a USIM. Furthermore, access to a base station for home use is generally limited to communication terminals registered in a whitelist. Additionally, in 3GPP, this whitelist for femtocells is called a Closed Subscriber Group (CSG) list. The whitelist above is information stored in the server of a communications company, and is considered to be generally registered with the communications company based on an application from a subscriber. Additionally, restriction on connection to a base station is described in JP-A-2009-207106, for example.

SUMMARY OF THE INVENTION

Here, it is assumed that a subscriber of a femtocell base station for home use applies the communication terminal of a family member as a terminal to be registered in the whitelist. Thus, an issue may be expected that, in the case a friend visits the home of the subscriber of the femtocell base station, the communication terminal of the friend is not permitted to connect to the femtocell base station due to not being registered in the whitelist.

In light of the foregoing, it is desirable to provide a communication management method, a management server, a communication system which are novel and improved, and which are capable of flexibly changing a communication terminal capable of connecting to a base station such as a femtocell base station.

According to an embodiment of the present invention, there is provided a communication management method which includes the steps of registering, by a management server managing communication of a base station, a communication terminal whose connection to the base station is to be permitted as a first communication terminal, registering, by the management server, another communication terminal as a second communication terminal based on a request from the communication terminal registered as the first communication terminal, requesting the base station, by a communication terminal, for connection, and permitting, by the management server, connection to the base station in a case the communication terminal which has requested the base station for connection is registered as the first communication terminal or the second communication terminal.

The communication management method may further include the step of deleting the communication terminal registered as the second communication terminal, based on a request from the communication terminal itself or the communication terminal registered as the first communication terminal.

An expiration date may be set for registration of the communication terminal as the second communication terminal.

The communication management method may further include the steps of deciding, in a case connection to the base station is requested by the communication terminal registered as the first communication terminal, whether a predetermined number is already reached by the number of communication terminals currently connected to the base station or not, and issuing, in a case the predetermined number is already reached by the number of the communication terminals currently connected to the base station, a notification of handover or disconnection command to the communication terminal registered as the second communication terminal among the communication terminals currently connected to the base station.

The predetermined number may be a maximum number of communication terminals that can connect to the base station.

The management server may register, as the first communication terminal, a communication terminal for which an application has been made by a subscriber of the base station, and registers the other communication terminal as the second communication terminal also in a case registration of the other communication terminal is requested by the subscriber of the base station.

According to another embodiment of the present invention, there is provided a management server which includes a communication unit for communicating with a base station, a storage unit for storing, as a first communication terminal, a communication terminal whose connection to the base station is to be permitted, a registration management unit for registering, in the storage unit, another communication terminal as a second communication terminal based on a request from the communication terminal registered as the first communication terminal, and a communication control unit for permitting connection to the base station in a case a communication terminal requests the base station for connection and the communication terminal is registered as the first communication terminal or the second communication terminal.

The registration management unit may delete the communication terminal registered as the second communication terminal, based on a request from the communication terminal itself or the communication terminal registered as the first communication terminal.

The registration management unit may set an expiration date for registration of the communication terminal as the second communication terminal.

The management server may further include a deciding unit for deciding, in a case connection to the base station is requested by the communication terminal registered as the first communication terminal, whether a predetermined number is already reached by the number of communication terminals currently connected to the base station or not. The communication control unit may issue, in a case the deciding unit decides that the predetermined number is already reached by the number of the communication terminals currently connected to the base station, a notification of handover or disconnection command to the communication terminal registered as the second communication terminal among the communication terminals currently connected to the base station.

The predetermined number may be a maximum number of communication terminals that can connect to the base station.

The registration management unit may register, as the first communication terminal, a communication terminal for which an application has been made by a subscriber of the base station, and registers the other communication terminal as the second communication terminal also in a case registration of the other communication terminal is requested by the subscriber of the base station.

According to another embodiment of the present invention, there is provided a communication system which includes a base station, and a management server including a storage unit for storing, as a first communication terminal, a communication terminal whose connection to the base station is to be permitted, a registration management unit for registering, in the storage unit, another communication terminal as a second communication terminal based on a request from the communication terminal registered as the first communication terminal, and a communication control unit for permitting connection to the base station in a case a communication terminal requests the base station for connection and the communication terminal is registered as the first communication terminal or the second communication terminal.

According to the embodiments of the present invention described above, it is possible to flexibly change a communication terminal capable of connecting to a base station such as a femtocell base station.

BRIEF DESCRIPTION OF THE DRAWINGS

FIG. 3 is an explanatory diagram showing concrete examples of a first list and a second list;

FIG. 9 is an explanatory diagram showing a concrete example of a terminal list according to a modification.

DETAILED DESCRIPTION OF THE EMBODIMENT

Figure 1:
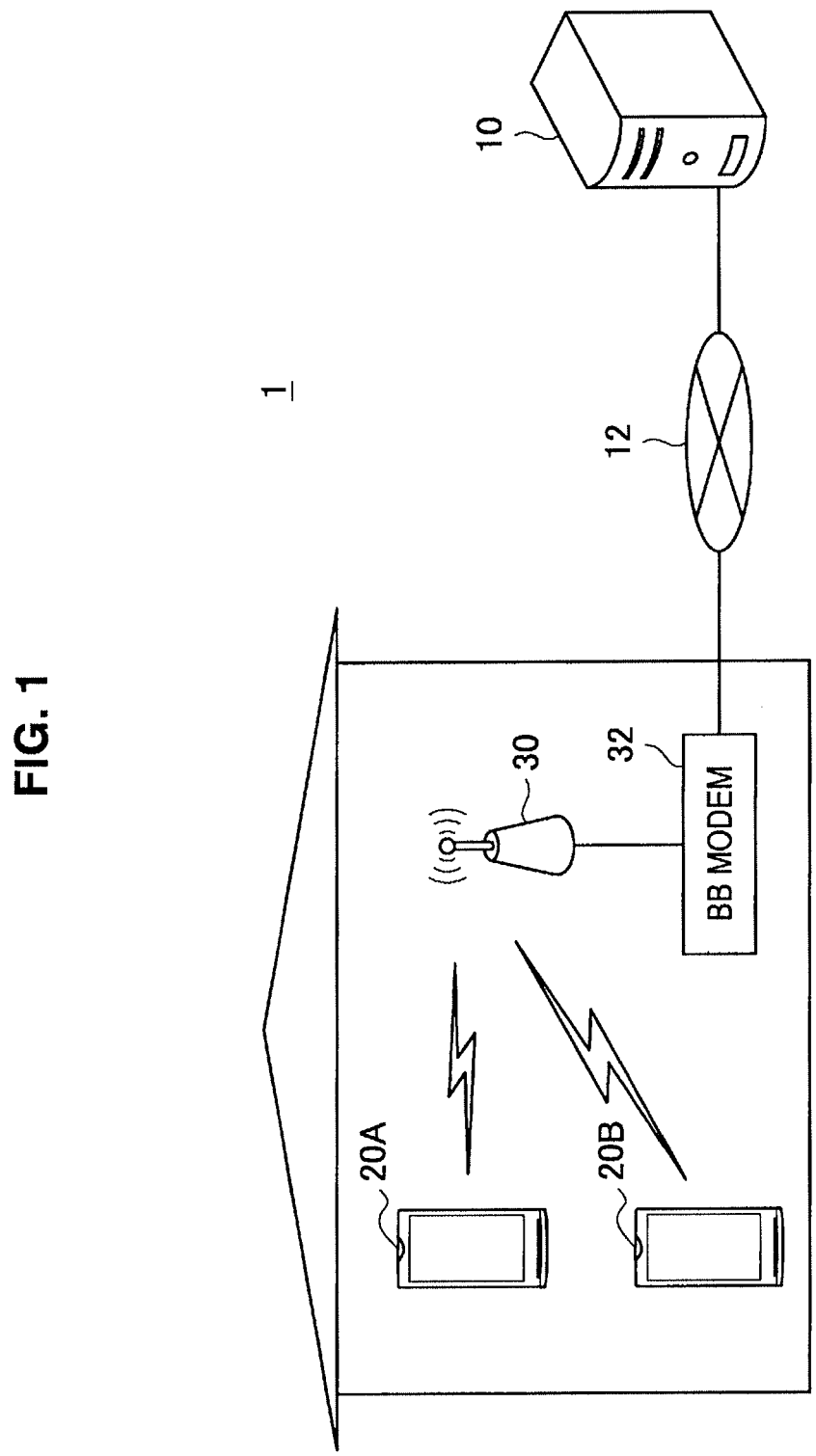
FIG. 1 is an explanatory diagram showing a configuration of a communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, in this specification and the drawings, a plurality of structural elements having substantially the same functional configuration may be distinguished from each other by each having a different letter added to the same reference numeral. For example, a plurality of elements having substantially the same functional configuration are distinguished from each other as necessary as communication terminals 20A and 20B. However, if it is not particularly necessary to distinguish each of a plurality of structural elements having substantially the same functional configuration, only the same reference numeral is assigned. For example, if it is not particularly necessary to distinguish between the communication terminals 20A and 20B, they are simply referred to as the communication terminals 20.

Additionally, "DETAILED DESCRIPTION OF THE EMBODIMENT" will be described in the item order below.
1. Overall Configuration of Communication System
2. Configuration of Management Server
3. Various Operations in Communication System
   3-1. Connection between Communication Terminal and Femtocell Base Station
   3-2. Registration of Terminal in Second List
   3-3. Deletion of Terminal from Second List
   3-4. Preferential Connection of Communication Terminal Registered in First List
4. Summary
5. Modification
   (Modification 1)
   (Modification 2)
   (Modification 3)

<1. Overall Configuration of Communication System>

First, an overall configuration of a communication system 1 according to an embodiment of the present invention will be described with reference to FIG. 1.

FIG. 1 is an explanatory diagram showing a configuration of the communication system 1 according to the embodiment of the present invention. As shown in FIG. 1, the communication system 1 according to the embodiment of the present invention includes a management server 10, the Internet 12, communication terminals 20A and 20B, a femtocell base station 30, and a BB modem 32. Furthermore, as shown in FIG. 1, the communication terminals 20A and 20B, the femtocell base station 30, and the BB modem 32 are installed at one home, for example.

The femtocell base station 30 is a small indoor base station compatible with a UMTS mobile phone wireless method standardized by 3GPP, for example, and can connect with the communication terminal 20 having a mobile phone interface compatible with the UMTS method. The femtocell base station 30 is connected with the management server 10 via the BB (broadband) modem 32 and the Internet 12. This femtocell base station 30 has a structure for mounting a memory card for authentication that stores authentication information used for performing authentication with a communications company (for example, the management server 10). Additionally, this memory card for authentication is a universal subscriber identity module (USIM) mounted by a subscriber of the femtocell base station 30, for example.

Additionally, the femtocell base station 30 is only an example of a base station controlling communication with the communication terminal 20, and the base station is not limited to the femtocell base station 30. For example, the embodiment of the present invention can also be applied to a base station such as a microcell base station, a picocell base station, and a relay station that relays communication between a macrocell base station and the communication terminal 20. Also, an example is shown in FIG. 1 where only the femtocell base station 30 is connected to the management server 10, but in reality, a large number of femtocell base stations are assumed to connect to the management server 10.

In the case connection with the femtocell base station 30 is permitted by the management server 10 or the femtocell base station 30, the communication terminal 20 can perform data communication via the femtocell base station 30. For example, the communication terminal 20 can perform voice communication or exchange of content data such as video data and voice data via the femtocell base station 30.

Additionally, in FIG. 1, a mobile phone is shown as an example of the communication terminal 20, but the hardware of the communication terminal 20 is not limited to a mobile phone. For example, the communication terminal 20 may also be an information processing apparatus, such as a personal computer (PC), a home video processing apparatus (such as a DVD recorder or a video cassette recorder), a personal digital assistant (PDA), a home game machine, or a home appliance. Furthermore, the communication terminal 20 may also be an information processing apparatus such as a personal handyphone system (PHS), a portable music playback device, a portable video processing device, a portable game machine, or the like.

The management server 10 is installed in a communications company's network (core network of a communications company), for example, and performs authentication of the femtocell base station 30, the communication terminal 20, and the like. Specifically, the management sever 10 according to the embodiment of the present invention stores first and second lists of different properties. The management server 10 permits connection with the femtocell base station 30 to only the communication terminal registered in either of the first and second lists. In the following, a configuration of the management server 10 having such first and second lists will be described in greater detail.

<2. Configuration of Management Server>

Figure 2:
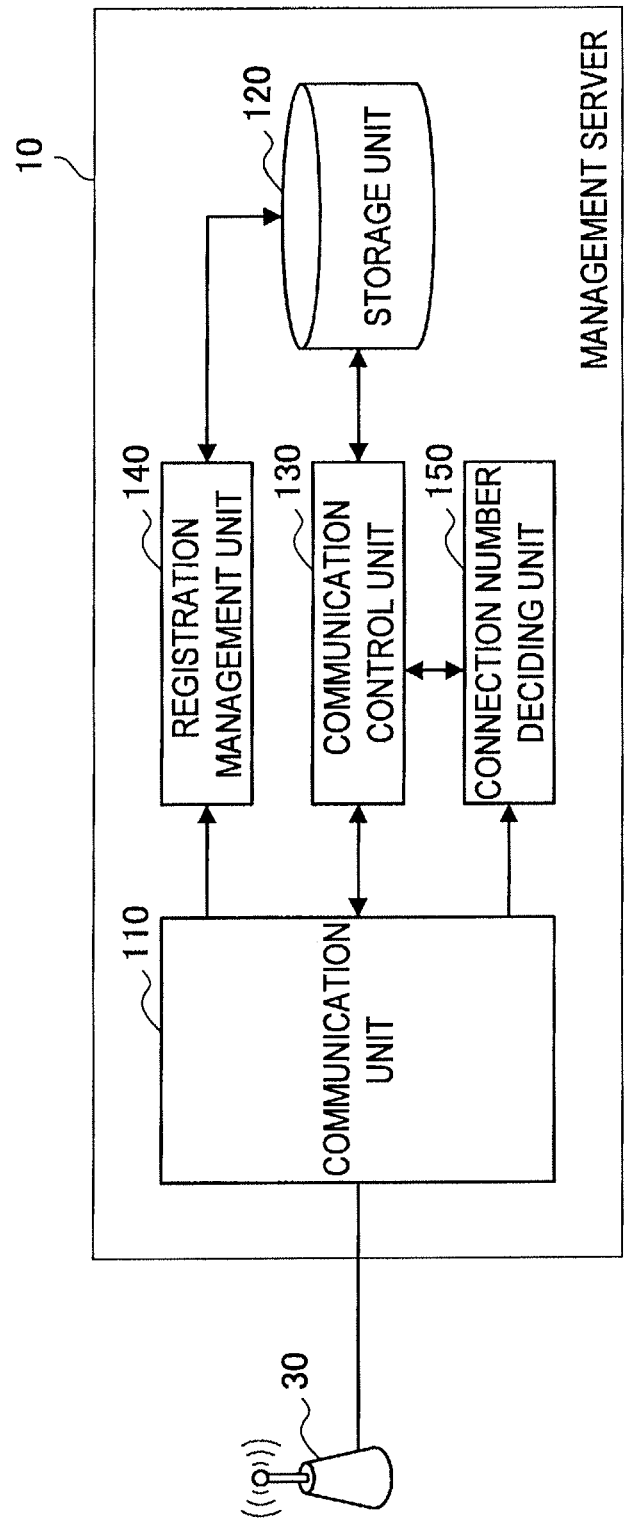
FIG. 2 is a function block diagram showing a configuration of a management server according to the embodiment of the present invention.

FIG. 2 is a function block diagram showing a configuration of the management server 10 according to the embodiment of the present invention. As shown in FIG. 2, the management server 10 includes a communication unit 110, a storage unit 120, a communication control unit 130, a registration management unit 140, and a connection number deciding unit 150.

The communication unit 110 is an interface to the femtocell base station 30, and exchanges various types of information with the femtocell base station 30 via the BB modem 32 or the Internet. For example, the communication unit 110 receives, from the femtocell base station 30, terminal information (a terminal ID, a telephone number, a user name, or the like) of the communication terminal 20 which has made a connection request to the femtocell base station 30, or transmits, to the femtocell base station 30, a notification indicating connection permission or connection denial.

The storage unit 120 stores, for each femtocell base station 30, a terminal list showing communication terminals permitted to connect to the femtocell base station 30. Specifically, the storage unit 120 stores first and second lists. A communication terminal for which an application has been made by a subscriber of the femtocell base station 30 is registered, based on the application from the subscriber of the femtocell base station 30, in the first list as a first communication terminal. Also, other communication terminal requested by the communication terminal registered in the first list is registered, by the registration management unit 140, in the second list as a second communication terminal.

Additionally, a case is also conceivable where the subscriber of the femtocell base station 30 and the user of the communication terminal registered in the first list are not the same. For example, in an apartment, the owner of the apartment is assumed to be the subscriber of the femtocell base station 30 and a resident of the apartment is assumed to be the user of the communication terminal registered in the first list. Thus, not only the communication terminal registered in the first list, but also the subscriber of the femtocell base station 30 may have the authority for terminal registration in the second list.

FIG. 3 is an explanatory diagram showing concrete examples of the first and second lists. As shown in FIG. 3, the first list is compiled from one or more entries each made up of a terminal ID, a telephone number, and a user name, for example. Also, the second list is compiled from one or more entries each made up of a terminal ID, and a telephone number, for example. Additionally, the elements making up each entry are not limited to the examples shown in FIG. 3, and some of the elements shown in FIG. 3 may be omitted or other element, such as a mail address, may be added.

The memory 120 storing the first and second lists as described may be a storage medium such as a non-volatile memory, a magnetic disk, an optical disk, or a magneto-optical (MO) disk. The non-volatile memory may be, for example, an electrically erasable programmable read-only memory (EEPROM), or an erasable programmable read-only memory (EPROM). Also, the magnetic disk may be a hard disk, a discoid magnetic disk, or the like. Furthermore, the optical disk may be a compact disc (CD), a digital versatile disc recordable (DVD-R), a Blu-ray disc (BD; registered trademark), or the like.

As will be described in detail in "3-1. Connection between Communication Terminal and Femtocell Base Station," the communication control unit 130 permits connection to the femtocell base station 30 in the case the communication terminal 20 which has made a connection request to the femtocell base station 30 is registered in the first or second list. Also, as will be described in detail in "3-4. Preferential Connection of Communication Terminal Registered in First List," the communication control unit 130 performs control to prioritise connection between the communication terminal registered in the first list and the femtocell base station 30 over connection between the communication terminal registered in the second list and the femtocell base station 30.

The registration management unit 140 performs editing of list such as registration of a terminal in the second list and deletion of a terminal from the second list. Specifically, in the case registration of another communication terminal in the second list is requested by the communication terminal registered in the first list, the registration management unit 140 registers such another communication terminal in the second list. As a result, such another communication terminal is enabled to connect to the femtocell base station 30.

For example, a case is considered where the femtocell base station 30 is installed at a certain home, the communication terminal 20 of a family member of this home is registered in the first list, and a friend visits this home. In this case, the communication terminal of the friend is enabled to connect to the femtocell base station 30 by requesting, from the communication terminal 20 of the family member, registration of the communication terminal of the friend in the second list and registering the communication terminal of the friend in the second list.

As described, according to the embodiment of the present invention, a communication terminal that can connect to the femtocell base station 30 can be flexibly changed, and thus a high convenience can be achieved. Furthermore, since the authority for terminal registration in the second list is granted only to the communication terminal registered in the first list, and thus security can be guaranteed.

The connection number deciding unit 150 decides whether a specific number is already reached by the number of terminals currently connected to the femtocell base station 30 or not. The specific number may be a maximum possible connection number of the femtocell base stations 30 or may be a number smaller than the maximum possible connection number by N (N is any positive number that is 1 or more). The decision result by the connection number deciding unit 150 is used for control by the communication control unit 130 for prioritizing communication by the communication terminal 20 registered in the first list.

<3. Various Operations in Communication System>

In the foregoing, the configuration of the management server 10 according to the embodiment of the present invention has been described with reference to FIGS. 2 and 3. Next, various operations in the communication system according to the embodiment of the present invention will be sequentially described.

(3-1. Connection Between Communication Terminal and Femtocell Base Station)

Figure 4:
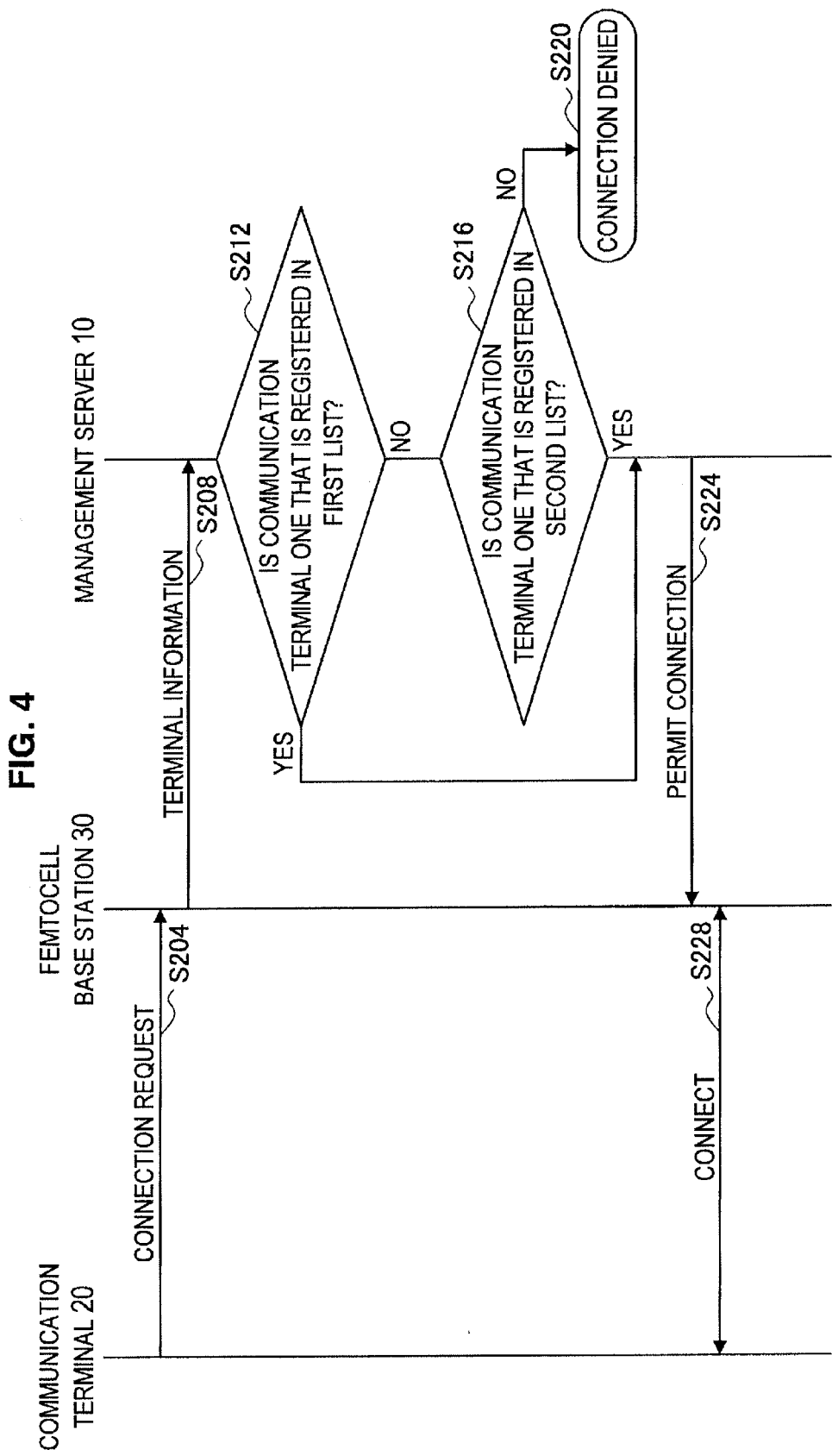
FIG. 4 is an explanatory diagram showing a sequence for connecting a communication terminal and a femtocell base station.

FIG. 4 is an explanatory diagram showing a sequence for connecting the communication terminal 20 and the femtocell base station 30. As shown in FIG. 4, when the communication terminal 20 requests for connection with the femtocell base station 30 (S204), the femtocell base station 30 transmits terminal information of the communication terminal 20 to the management server 10 (S208). Here, a terminal ID, a telephone number, a user name, or the like, can be cited as the terminal information.

Next, the communication control unit 130 of the management server 10 decides whether the communication terminal 20 is registered in the first list or not, based on the terminal information received from the femtocell base station 30 (S212). Furthermore, in the case the communication terminal 20 is not registered in the first list, the communication control unit 130 decides whether the communication terminal 20 is registered in the second list or not (S216).

Then, in the case the communication terminal 20 is registered in the first or second list, the communication control unit 130 permits connection between the communication terminal 20 and the femtocell base station 30 (S224). Then, the communication terminal 20 and the femtocell base station 30 are connected. On the other hand, in the case the communication terminal 20 is not registered in either of the first and second lists, the communication control unit 130 denies connection between the communication terminal 20 and the femtocell base station 30 (S220).

(3-2. Registration of Terminal in Second List)

Figure 5:
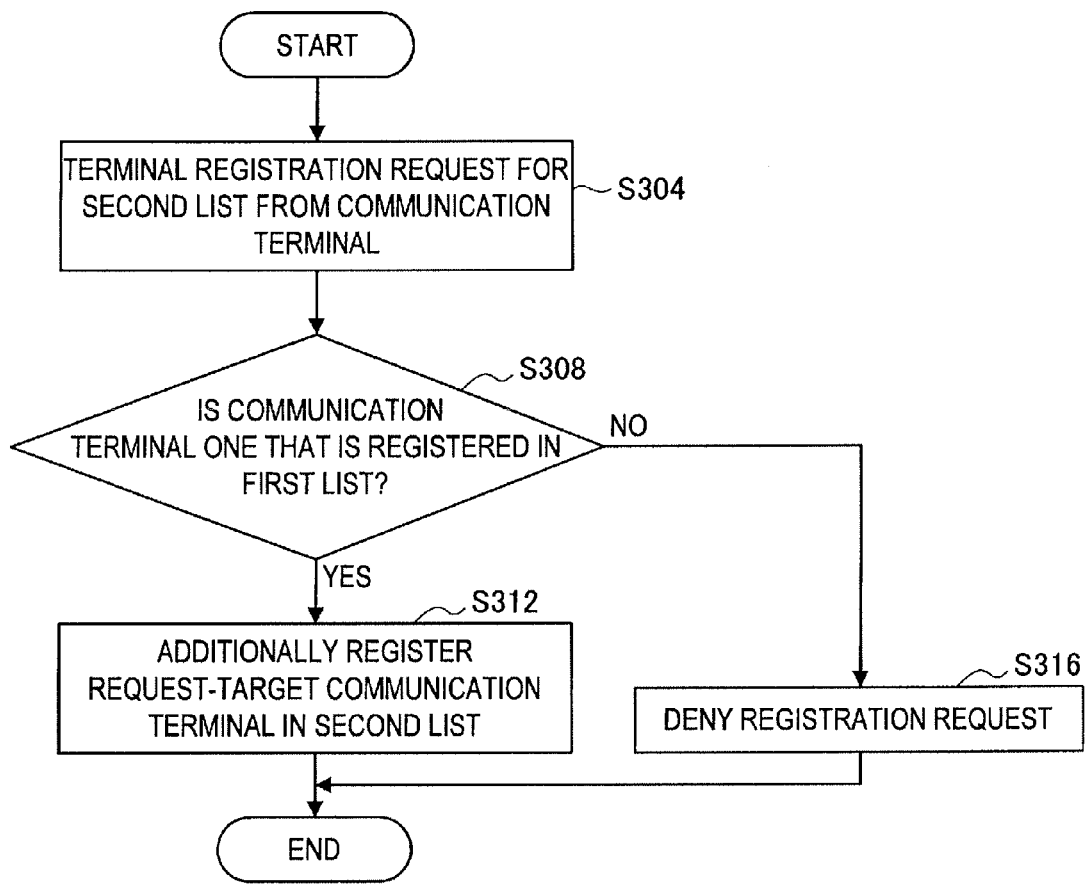
FIG. 5 is an explanatory diagram showing a sequence for registering a terminal in the second list.

FIG. 5 is an explanatory diagram showing a sequence for registering a terminal in the second list. As shown in FIG. 5, first, the management server 10 receives a terminal registration request for the second list from the communication terminal 20 (S304). For example, the management server 10 receives, as the terminal registration request, terminal IDs, telephone numbers, or the like, of the communication terminal 20 which is a request source and another communication terminal which is a request target. Additionally, the communication terminal 20 may transmit the terminal registration request via the femtocell base station 30 or may transmit the same over a wire.

Next, the registration management unit 140 of the management server 10 decides whether the communication terminal 20 which is the request source is registered in the first list or not (S308). Then, in the case the communication terminal 20 which is the request source is registered in the first list, the registration management unit 140 additionally registers the other communication terminal which is the request target in the second list (S312). On the other hand, in the case the communication terminal 20 which is the request source is not registered in the first list, the registration management unit 140 denies the terminal registration request (S316).

As described, by granting the authority for terminal registration in the second list to the communication terminal 20 registered in the first list, security in use can be guaranteed.

Additionally, the registration management unit 140 may set an expiration date when registering a terminal in the second list, and may delete registration of the terminal for which the expiration date is reached. This expiration date may be specified by the communication terminal 20, or may be a specific date or time such as 24 hours later, 1 week later or 1 month later.

(3-3. Deletion of Terminal from Second List)

Figure 6:
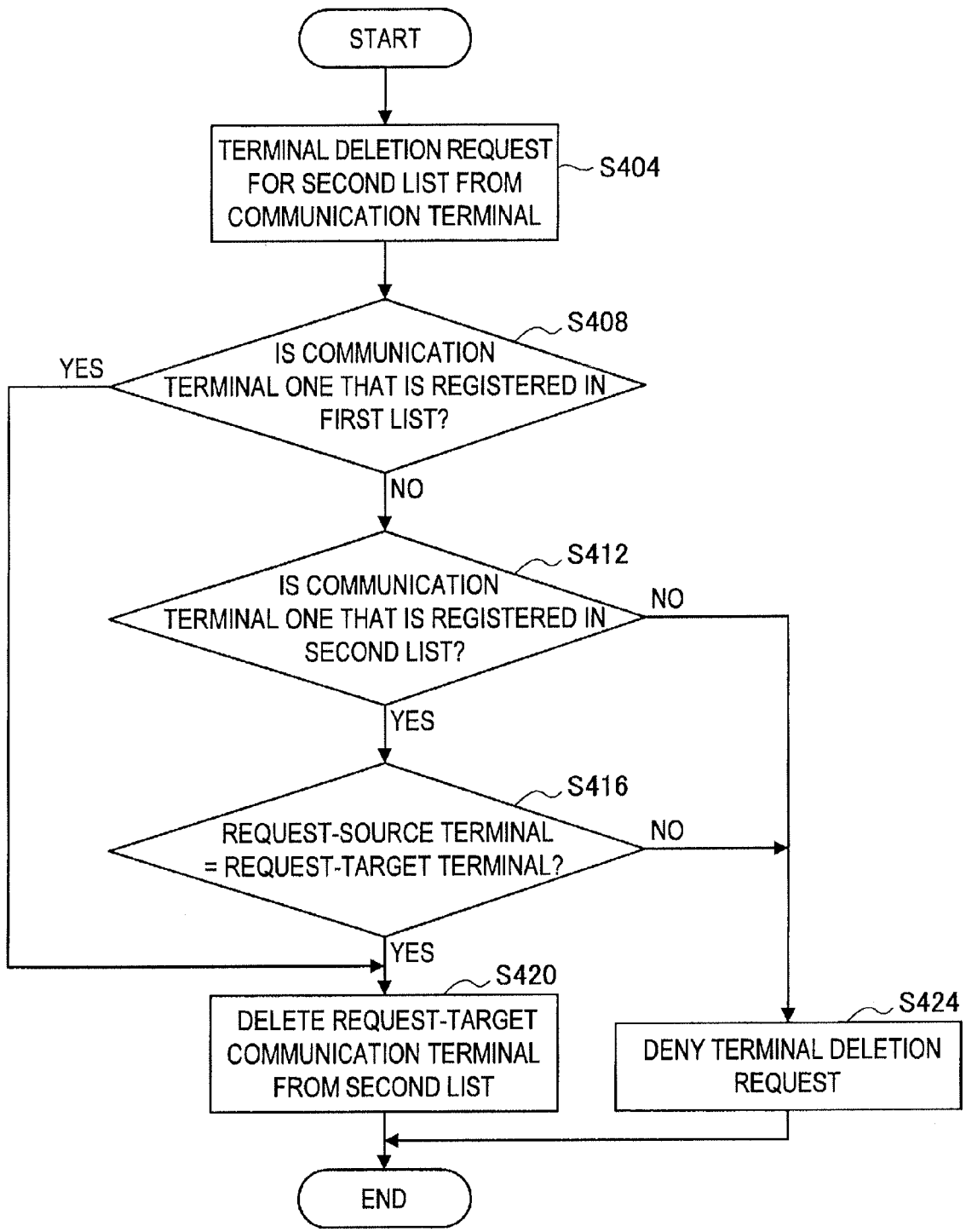
FIG. 6 is an explanatory diagram showing a sequence for deleting terminal registration from the second list.

FIG. 6 is an explanatory diagram showing a sequence for deleting terminal registration from the second list. As shown in FIG. 6, first, the management server 10 receives a terminal deletion request for the second list from the communication terminal 20 (S404). For example, the management server 10 receives, as the terminal deletion request, terminal IDs, telephone numbers, or the like of the communication terminal 20 which is a request source and a communication terminal which is a request target. Additionally, the communication terminal 20 may transmit the terminal deletion request via the femtocell base station 30 or may transmit the same over a wire.

Next, the registration management unit 140 of the management server 10 decides whether the communication terminal 20 which is the request source is registered in the first list or not (S408). Then, in the case the communiterminal 20 is not registered in the first list, the registration management unit 140 decides whether the communication terminal 20 is registered in the second list or not (S412). Furthermore, in the case the communication terminal 20 is registered in the second list, the registration management unit 140 decides whether the communication terminal 20 which is the request source and the communication terminal which is the request target are the same or not (S416).

Then, in the case it is decided in S408 that the communication terminal 20 which is the request source is registered in the first list or in the case it is decided in step S416 that the communication terminal 20 which is the request source and the communication terminal which is the request target are the same, the registration management unit 140 deletes the communication terminal which is the request target from the second list (S420). On the other hand, in the case the communication terminal 20 which is the request source is registered in neither the first list nor the second list or in the case it is decided in S416 that the communication terminal 20 which is the request source and the communication terminal which is the request target are not the same, the registration management unit 140 denies the terminal deletion request (S424).

As described above, the authority for terminal registration in the second list is granted only to the communication terminal that is registered in the first list, but on the other hand, the authority for terminal deletion from the second list is granted also to the communication terminal registered in the second list. Accordingly, the communication terminal registered in the second list is not permitted to register another communication terminal in the second list, but can delete itself from the second list.

(3-4. Preferential Connection of Communication Terminal Registered in First List)

As has been described, according to the embodiment of the present invention, not only the communication terminal registered in the first list, but also the communication terminal registered in the second list can connect to the femtocell base station 30. Here, it is assumed that the number of terminals that can simultaneously connect to the femtocell base station 30 is limited to, for example, four.

Thus, a case is conceivable where, due to the communication terminal registered in the second list being connected to the femtocell base station 30, the communication terminal registered in the first list is not permitted to connect to the femtocell base station 30. More specifically, a case is conceivable where the father or the mother is not allowed to use the femtocell base station 30 due to their son's friend visiting the home and the communication terminal of the son's friend being connected to the femtocell base station 30.

Accordingly, in the embodiment of the present invention, connection between the communication terminal registered in the first list and the femtocell base station 30 is prioritized over connection between the communication terminal registered in the second list and the femtocell base station 30. In the following, processing for prioritizing the connection between the communication terminal registered in the first list and the femtocell base station 30 will be described in detail.

Figure 7:
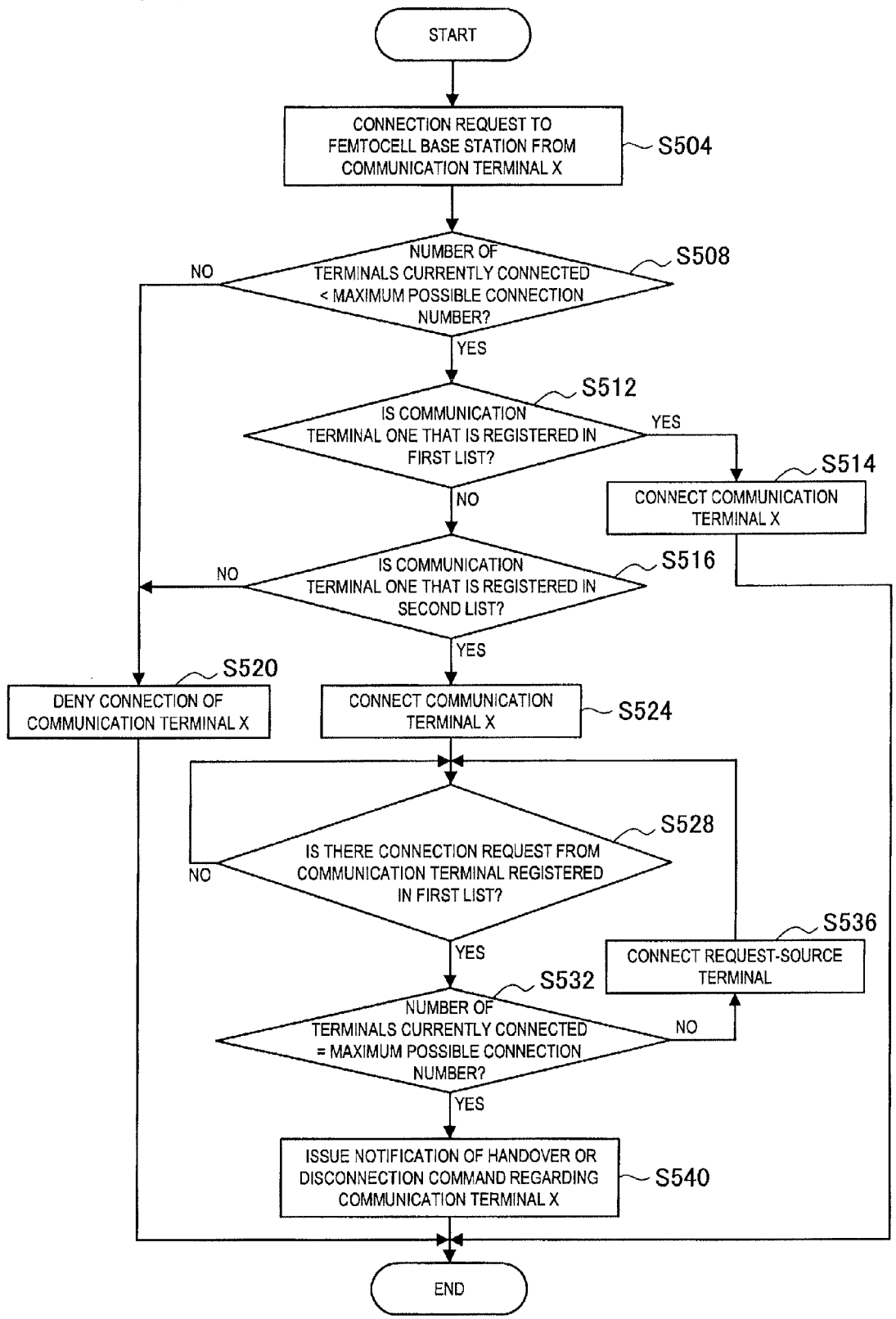
FIG. 7 is an explanatory diagram showing a sequence for preferentially connecting a communication terminal registered in the first list to a femtocell base station.

FIG. 7 is an explanatory diagram showing a sequence for preferentially connecting the communication terminal 20 registered in the first list to the femtocell base station 30. As shown in FIG. 7, a case is considered where the management server 10 has received from a communication terminal 20X a connection request to the femtocell base station 30 (S504). In this case, the connection number deciding unit 150 decides whether a maximum possible connection number of the femtocell base station 30 is already reached by the number of terminals currently connected to the femtocell base station 30 or not (S508).

Then, in the case the maximum possible connection number is not yet reached by the number of terminals currently connected, the communication control unit 130 decides whether the communication terminal 20X is registered in the first list or not and whether it is registered in the second list or not (S512, S516).

Here, in the case it is decided in S512 that the communication terminal 20X is registered in the first list, the communication control unit 130 permits connection between the communication terminal 20X and the femtocell base station 30 (S514). Then, the communication terminal 20X and the femtocell base station 30 are connected.

On the other hand, in the case the maximum possible connection number is already reached by the number of terminals currently connected or in the case the communication terminal 20X is registered in neither the first list nor the second list, the communication control unit 130 denies connection of the communication terminal 20X (S520).

Also, in the case it is decided in S516 that the communication terminal 20X is registered in the second list, the communication control unit 130 permits connection between the communication terminal 20X and the femtocell base station 30 (S524). Then, when a connection request is received by the communication unit 110 from the communication terminal 20 registered in the first list (S528), the connection number deciding unit 150 decides whether the maximum possible connection number is already reached by the number of terminals currently connected (S532). Then, in the case the maximum possible connection number is not yet reached by the number of terminals currently connected, the communication control unit 130 connects the communication terminal 20 which is the request source to the femtocell base station 30 (S536).

On the other hand, in the case the maximum possible connection number is already reached by the number of terminals currently connected, the communication control unit 130 issues a notification of handover or connection disconnection command regarding the communication terminal 20X, registered in the second list, that is currently connected (S540). This enables to preferentially connect the communication terminal 20 registered in the first list to the femtocell base station 30.

Additionally, in the above, an example has been explained where a notification of handover or connection disconnection command regarding the communication terminal 20X is issued when a connection request is received from the communication terminal 20 registered in the first list in a state where the maximum possible connection number is already reached by the number of terminals currently connected, but the notification of handover or connection disconnection command regarding the communication terminal 20X may be issued at a time point the maximum possible connection number is reached by the number of terminals currently connected. According to such a configuration, since the number of terminals currently connected will have been (the maximum possible connection number−1) at the time connection is requested by the communication terminal 20 registered in the first list, the communication terminal 20 registered in the first list can connect to the femtocell base station 30 at an early point.

<4. Summary>

As has been described above, according to the embodiment of the present invention, the communication terminal 20 connected to either the first list or the second list can connect to the femtocell base station 30. Also, the authority for terminal registration in the second list is granted to the communication terminal 20 registered in the first list, and thus security in use can be guaranteed.

On the other hand, the authority for terminal registration in the second list is granted only to the communication terminal that is registered in the first list, but the authority for terminal deletion from the second list is granted also to the communication terminal registered in the second list. Accordingly, the communication terminal registered in the second list is not permitted to register another communication terminal in the second list, but can delete itself from the second list. Furthermore, according to the embodiment of the present invention, connection between the communication terminal registered in the first list and the femtocell base station 30 can be prioritized over connection between the communication terminal registered in the second list and the femtocell base station 30.

<5. Modification>

It should be understood by those skilled in the art that various modifications, combinations, sub-combinations and alterations may occur depending on design requirements and other factors insofar as they are within the scope of the appended claims or the equivalents thereof.

For example, the steps of the processing of the communication system 1 and the management server 10 according to the present specification do not necessarily have to be processed chronologically according to the order described as the sequence chart or the flow chart. For example, the steps of the processing of the communication system 1 and the management server 10 can also be processed in an order different from that described as the flow chart or may be processed in parallel.

Furthermore, a computer program for causing hardware, such as a CPU, a ROM, or a RAM, embedded in the management server 10 to realize an equivalent function as each element of the management server 10 described above can also be created. Furthermore, a storage medium storing the computer program is also provided.

Furthermore, it is understood, as a matter of course, that modifications 1 to 3 described below are also within the technical scope of the present invention.

(Modification 1)

In the above, an example has been explained where terminal authentication is performed at the management server 10, but the present invention is not limited to such an example. As will be described below as modification 1, terminal authentication can also be performed by the femtocell base station 30.

Figure 8:
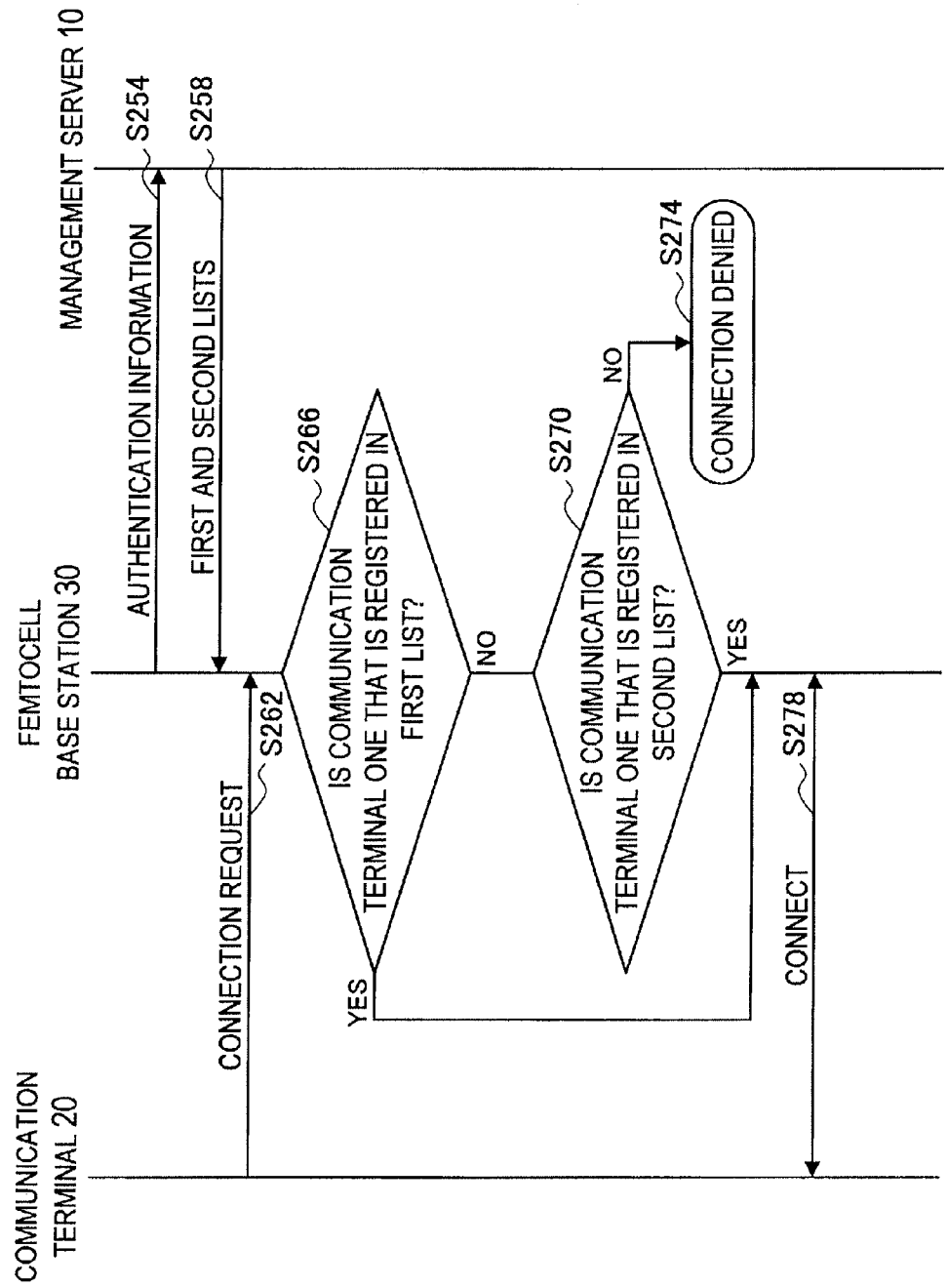
FIG. 8 is an explanatory diagram showing a modification of a sequence for connecting a communication terminal 20 and a femtocell base station 30.

FIG. 8 is an explanatory diagram showing a modification of the sequence for connecting the communication terminal 20 and the femtocell base station 30. As shown in FIG. 8, first, the femtocell base station 30 transmits authentication information stored in a memory card for authentication to the management server 10, and the management server 10 authenticates the femtocell base station 30 based on the authentication information (S254).

Then, if authentication of the femtocell base station 30 is successful, the management server 10 transmits, to the femtocell base station 30, the first and second lists stored in association with the femtocell base station 30 (S258).

Then, when a connection request is received from the communication terminal 20 (S262), the femtocell base station 30 decides whether the communication terminal 20 is registered in the first list or not (S266). Furthermore, in the case the communication terminal 20 is not registered in the first list, the femtocell base station 30 decides whether the communication terminal 20 is registered in the second list or not (S270).

Then, in the case the communication terminal 20 is registered in the first list or the second list, the femtocell base station 30 permits connection of the communication terminal 20 (S278). On the other hand, in the case the communication terminal 30 is registered in neither the first list nor the second list, the femtocell base station 30 denies connection between the communication terminal 20 and the femtocell base station 30 (S274).

As has been described, it is also possible to have the management server 10 supply the first and second lists to the femtocell base station 30 and to have the femtocell base station 30 perform terminal authentication based on the first and second lists.

(Modification 2)

In the above, an example has been explained where the management server 10 holds separately the first list showing the communication terminals registered as first communication terminals and the second list showing the communication terminals registered as second communication terminals, but the registration mode of communication terminals is not limited to such an example. As will be described below as modification 2, the first and second communication terminals can also be managed by a single list.

FIG. 9 is an explanatory diagram showing a concrete example of a terminal list according to the modification. As shown in FIG. 9, the terminal list according to the modification is compiled from one or more entries each made up of a terminal ID, a telephone number, and a registration type, for example. Here, the registration type is information indicating whether a communication terminal is registered as the first communication terminal or as the second communication terminal. Specifically, in the case the registration type is "1," it is indicated that the communication terminal indicated by the entry is registered as the first communication terminal, and in the case the registration type is "2," it is indicated that the communication terminal indicated by the entry is registered as the second communication terminal.

According to such configuration also, it is possible to decide whether the communication terminal 20 which has made the connection request, the terminal registration request or the terminal deletion request is registered as the first communication terminal or the second communication terminal, and to control connection processing, terminal registration processing or terminal deletion processing according to the result of the decision.

(Modification 3)

In the above, an example has been explained where the femtocell base station 30 is installed at home and the communication terminal 20 of a family member of this home is registered in the first list, but the installation location of the femtocell base station 30 and the communication terminal 20 to be registered in the first list are not particularly limited.

For example, the femtocell base station 30 may be installed at a store, and information indicating that any communication terminal 20 can connect to the femtocell base station 30 may be described in the first list. Then, with a user wishing to receive a specific service from this store registering his/her communication terminal 20 in the second list, the store is enabled to selectively provide the specific service (delivery of coupon or information, or the like) to the communication terminal 20 registered in the second list.

Furthermore, in the case legal restriction such as age restriction is placed on provision of the specific service, communication terminals to which the authority for terminal registration in the second list is granted may be limited to those that meet the legal restriction. According to such configuration, it is possible to provide the specific service to only the communication terminals that are legally recognized.

What is claimed is:

1. A first communication terminal comprising:
processing apparatus including a processor and a memory encoded with computer-executable instructions that, when executed by the processor, perform a method comprising:
communicating with a base station;
generating a request for registration of a communication terminal whose connection to the base station is to be permitted, the request being managed at a management server that decides whether a number of communication terminals currently connected to the base station has reached a threshold number; and
receiving a notification of handover or a disconnect command when the number of communication terminals currently connected to the base station has reached the threshold number,
wherein the request includes a registration request to register a second communication terminal to permit the second communication terminal to connect to the base station.

2. The first communication terminal as defined in claim 1, wherein the management server deletes a registration of the second communication terminal, based at least in part on a request from the second communication terminal or the first communication terminal.

3. The first communication terminal as defined in claim 1, wherein the management server sets an expiration date for a registration of the second communication terminal.

4. The first communication terminal as defined in claim 1, wherein the threshold number is a maximum number of communication terminals that can connect to the base station.

5. The first communication terminal as defined in claim 1, wherein the management server registers the second communication terminal in a case where registration of the second communication terminal is requested by a subscriber of the base station.

6. A communication management method comprising:
communicating, by a first communication terminal, with a base station;
generating, by the first communication terminal, a request for registration of a communication terminal whose connection to the base station is to be permitted, the request being managed at a management server that decides whether a number of communication terminals currently connected to the base station has reached a threshold number; and
receiving, by the first communication terminal, a notification of handover or a disconnect command when the number of communication terminals currently connected to the base station has reached the threshold number, wherein the request includes a registration request to register a second communication terminal to permit the second communication terminal to connect to the base station.

* * * * *